US008489922B2

(12) United States Patent
Matthew

(10) Patent No.: US 8,489,922 B2
(45) Date of Patent: Jul. 16, 2013

(54) NETWORKED RECOVERY SYSTEM

(75) Inventor: Jack R. Matthew, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 317 days.

(21) Appl. No.: 12/948,691

(22) Filed: Nov. 17, 2010

(65) Prior Publication Data
US 2012/0124419 A1    May 17, 2012

(51) Int. Cl.
*G06F 11/00* (2006.01)
(52) U.S. Cl.
USPC ............................. 714/15; 714/42; 714/47.1
(58) Field of Classification Search
USPC ........................................................... 714/15
See application file for complete search history.

(56) References Cited

U.S. PATENT DOCUMENTS

| | | | |
|---|---|---|---|
| 5,717,604 A * | 2/1998 | Wiggins | 709/229 |
| 5,842,011 A | 11/1998 | Basu | |
| 7,346,765 B2 * | 3/2008 | Graham et al. | 713/2 |
| 7,409,575 B2 | 8/2008 | Komarla et al. | |
| 7,734,945 B1 * | 6/2010 | Levidow et al. | 714/3 |
| 2002/0147941 A1 | 10/2002 | Gentile | |
| 2005/0240815 A1 | 10/2005 | Purkeypile et al. | |
| 2007/0226227 A1 * | 9/2007 | Helfman | 707/10 |
| 2007/0294566 A1 * | 12/2007 | Solyanik | 714/6 |
| 2008/0016178 A1 * | 1/2008 | Portugali | 709/217 |
| 2009/0034543 A1 * | 2/2009 | Thomas et al. | 370/401 |
| 2010/0017589 A1 * | 1/2010 | Reed et al. | 713/2 |
| 2010/0235617 A1 | 9/2010 | Chen | |
| 2012/0096312 A1 * | 4/2012 | Turner et al. | 714/19 |
| 2012/0117422 A1 * | 5/2012 | Radhakrishnan | 714/15 |

FOREIGN PATENT DOCUMENTS

| EP | 1736880 A2 | 12/2006 |
|---|---|---|
| KR | 10-2007-0083138 A | 8/2007 |

OTHER PUBLICATIONS

International Preliminary Report and Written Opinion, Mailed Mar. 23, 2012 for International Patent Application No. PCT/US2011/060760, 12 pages.

* cited by examiner

*Primary Examiner* — Kamini Patel
(74) *Attorney, Agent, or Firm* — Womble Carlyle Sandridge & Rice LLP

(57) ABSTRACT

A method and apparatus for networked recovery system is described herein. In one embodiment, a process is provided to obtain a type of recovery selected by a user. A non-volatile partition of a storage volume containing a recovery disk image is accessed. The recovery disk image does not include an installation package. If the obtained type of recovery is a predetermined type of recovery, a network connection is established using the recovery disk image and data is downloaded over the network connection for the obtained type of recovery. The obtained type of recovery of the system is performed.

28 Claims, 7 Drawing Sheets

NETWORKED RECOVERY SYSTEM

FIELD OF THE INVENTION

The field of invention can relate generally to computing systems, and, more specifically, to networked recovery systems.

BACKGROUND

Physical media can be provided with a purchase of a computer system. The physical media can allow a user to restore the computer system to the factory defaults if there is a problem with the computer system. The physical media can also be used to perform data recovery. However, physical media can be expensive and unreliable. The physical media can be faulty due to a manufacturing process problem or may not be supported by the disk drive used to read the physical media. Furthermore, the physical media is a fixed size which limits the amount of information that can be stored in the physical media. Moreover, the physical media is read-only so it cannot be updated or upgraded by the user. For example, if a user upgrades the operating system on the computer system and needs to restore the computer system, the physical media would restore the computer system to the originally installed operating system (factory default), rather than the upgraded version. If a user wanted to restore to the updated or upgraded version of the operating system, the user would be required to obtain a new physical media corresponding to the upgraded or updated version of the operating system or download and install the updates.

SUMMARY OF THE DESCRIPTION

Mechanisms for a networked recovery system are described herein. In one embodiment, a process can be provided to obtain a type of recovery selected by a user. A non-volatile partition of a storage volume containing a recovery disk image can, in one embodiment, be accessed. The recovery disk image does not include, in one embodiment, an installation package. If the obtained type of recovery is a predetermined type of recovery, a network connection can be established using the recovery disk image and data can be downloaded over the network connection for the obtained type of recovery. The obtained type of recovery of the system is performed. Systems, methods, and machine readable storage media which perform or implement one or more embodiments are also described.

In one embodiment, the storage volume can include a main partition which includes a full operating system (OS) and the software installed from installation packages, such as standard applications included with the OS (e.g., web browser software, image and PDF viewer software, movie viewer software, text processing software, music playing software, email software, etc) and software drivers (e.g., printer drivers, display drivers, keyboard drivers, etc.) and can also include the partition containing a recovery disk image which is a reduced version of the full OS and does not include most of the standard applications, but includes network access software and a web browser to download the necessary installation packages through a network from, for example, a store for software on the Internet (e.g., an iTunes store). The recovery disk image, in one embodiment, can also include recovery or rescue software such as software to restore user data from a backup storage device or software to repair a disk or check a disk (such as a disk utility software) or software to reinstall a full version of an OS through downloads or a combination of one or more of these types of software.

Other features of the present invention will be apparent from the accompanying drawings and from the detailed description which follows.

BRIEF DESCRIPTION OF THE DRAWINGS

The present invention is illustrated by way of example and not limited in the figures of the accompanying drawings, in which like references indicate similar elements and in which.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

A networked recovery system can be used to recover data for a computer system, rather than using expensive and unreliable physical media. In one embodiment, a type of recovery can be selected by a user. A non-volatile partition of a storage volume containing a recovery disk image is accessed. In one embodiment, the recovery disk image is an incomplete version of an operating system for the computer system. In this embodiment, the recovery disk image does not include an installation package or packages that can be used to install the operating software or standard software for the computer system. If the selected type of recovery is a predetermined type of recovery, a network connection is established using the recovery disk image and data is downloaded over the network connection for the selected type of recovery. The selected type of recovery of the system is performed.

Figure 1:
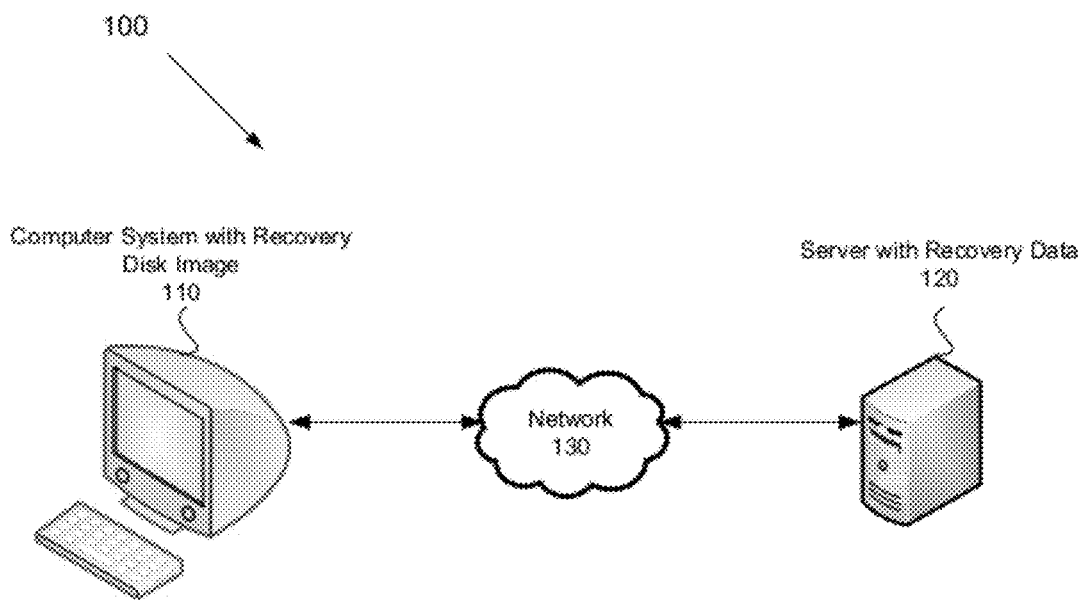
FIG. 1 illustrates an exemplary system architecture including computer system and a server in which embodiments of the present invention may operate.

FIG. 1 shows a system architecture 100 in which the networked recovery may be performed. System architecture 100 includes computer system with recovery disk image 110 and server with recovery data 120. Computer system with recovery disk image 110 and server with recovery data 120 may communicate with each other via network 130. In one embodiment, the recovery disk image within computer system with recovery disk image 110 may be a slimmed down operating system that does not include one or more installation packages required to install the operating system. In one embodiment, the recovery data within server with recovery data 120 may be data, including executable software, which is required to perform a recovery of computer system with recovery disk image 110. Data to be downloaded from server with recovery data 120 to computer system with recovery disk image 110 may be downloaded to computer system with recovery disk image 110 via network 130. In one embodiment, network 130 may be a public network (e.g., Internet) or a private network (e.g., local area network (LAN)).

Figure 2:
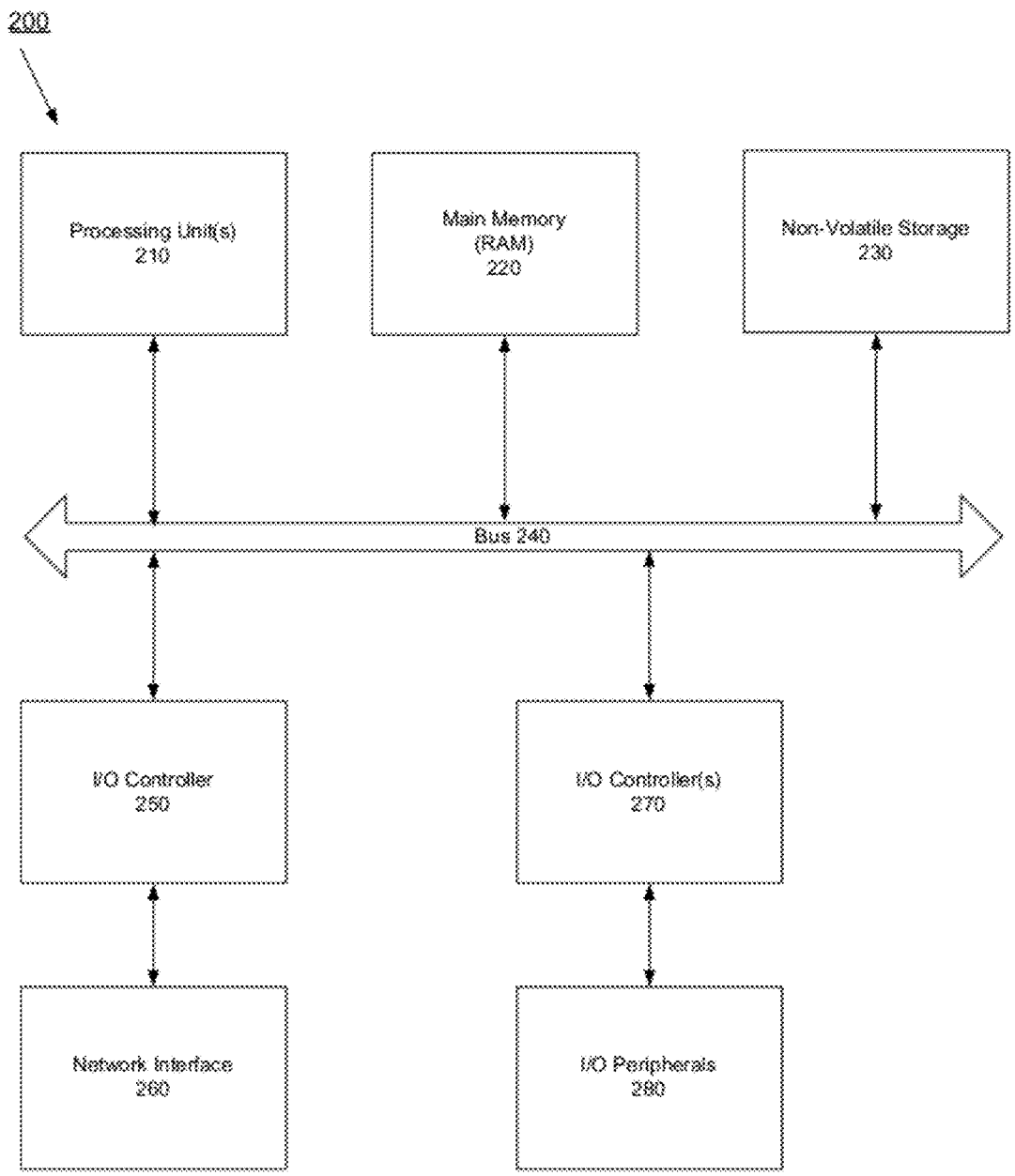
FIG. 2 illustrates a block diagram of an exemplary computer system in which embodiments of the present invention may operate.

FIG. 2 is a block diagram of an exemplary computer system in which embodiments of the present invention may operate. Computer system 200 includes processing unit(s) 210, main memory (RAM) 220, non-volatile storage 230, bus 240, I/O controller 250, network interface 260, I/O controller 270, and I/O peripherals 280.

Main memory 220 encompasses all volatile or non-volatile storage media, such as dynamic random access memory (DRAM), static RAM (SRAM), or flash memory. Main memory 220 includes storage locations that are addressable by the processing unit(s) 210 for storing computer program code and data structures for networked recovery of data. Such computer program code and data structures also may be stored in non-volatile storage 230. Non-volatile storage 230 includes all non-volatile storage media, such as any type of disk including floppy disks, optical disks such as CDs, DVDs and BDs (Blu-ray Disks), and magnetic-optical disks, magnetic or optical cards, or any type of media, and may be loaded onto the main memory 220. Those skilled in the art will immediately recognize that the term "computer-readable storage medium" or "machine readable storage medium" includes any type of volatile or non-volatile storage device that is accessible by a processor (including main memory 220 and non-volatile storage 230).

Processing unit(s) 210 is coupled to main memory 220 and non-volatile storage 230 through bus 240. Processing unit(s) 210 includes processing elements and/or logic circuitry configured to execute the computer program code and manipulate the data structures. It will be apparent to those skilled in the art that other processing and memory means, including various computer readable storage media, may be used for storing and executing computer program code pertaining to networked recovery.

Processing unit(s) 210 can retrieve instructions from main memory 220 and non-volatile storage 230 via bus 240 and execute the instructions to perform operations described below. Bus 240 is coupled to I/O controller 250. I/O controller 250 is also coupled to network interface 260. Network interface 260 can connect to a network to download data required for networked recovery.

Bus 240 is further coupled to I/O controller(s) 270. I/O controller(s) 270 are coupled to I/O peripherals 280, which may be mice, keyboards, modems, disk drives, optical drives, printers and other devices which are well known in the art.

Figure 3:
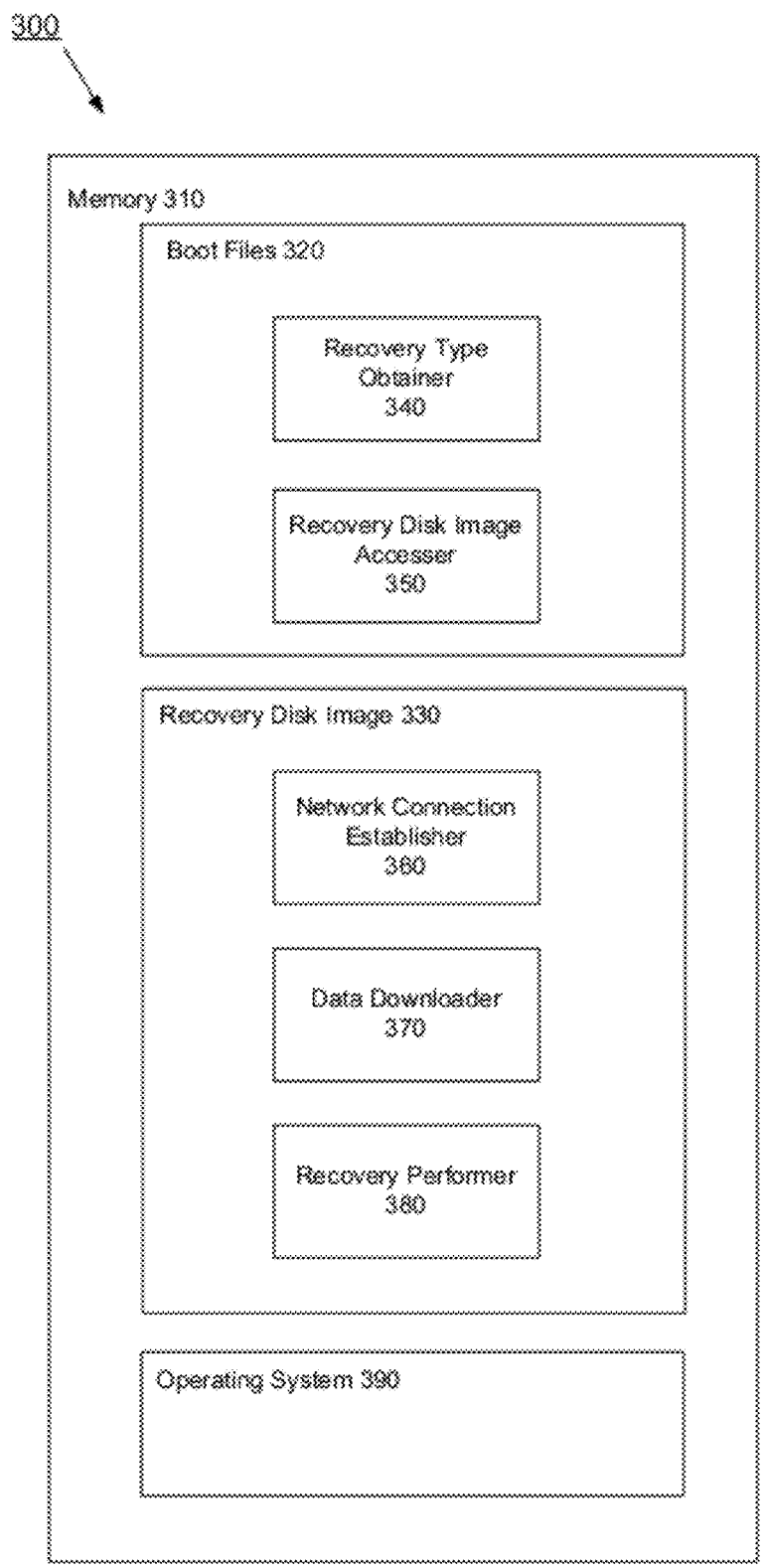
FIG. 3 illustrates an exemplary memory in accordance with FIG. 2.

FIG. 3 illustrates an exemplary main memory 220 or non-volatile storage 230 or both of FIG. 2. Referring to FIG. 3, memory 310 contains boot files 320, recovery disk image 330, and operating system 390. Within boot files 320, there is recovery type obtainer 340 and recovery disk image accesser 350. Within recovery disk image 330, there is network connection establisher 360, data downloader 370, and recovery performer 380. In other embodiments, the software components 340 and 350 can be separate from and not part of boot files 320 or can be a part of recovery disk image 330. Although memory 310 has been shown as a single memory, this is just one illustrative embodiment. In alternate embodiments, memory 310 can be split into more than one memory. Although recovery disk image 330 has been shown as part of memory 310, recovery disk image 330 can be stored in a non-volatile storage component as described below in conjunction with FIG. 4 and FIG. 5. Recovery disk image 330 can also include boot software and a kernel to allow a user to boot from recovery disk image 330 and then perform a recovery operation (such as, reinstall a version of a full operating system). Operating system 390 can include a full version of the operating system running on a computer system.

Recovery type obtainer 340 can obtain a type of recovery from a user that the user would like the computer system to perform using networked recovery. In one embodiment, the obtained type of recovery can be an operating system recovery. In an alternate embodiment, the obtained type of recovery can be a restore of user data from a backup of the data. In another alternate embodiment, the obtained type of recovery can be repair of a disk. In yet another alternate embodiment, the obtained type of recovery can be a password reset.

Recovery disk image accesser 350 can access a recovery disk image. In one embodiment, the recovery disk image accessed is recovery disk image 330 located in memory 310. In an alternate embodiment, the recovery disk image can be located in a partition of non-volatile storage as shown below in conjunction with FIG. 4 and FIG. 5. In one embodiment, recovery disk image accesser 350 reads memory 310 or the partition of non-volatile storage partition to access the recovery disk image. In an alternate embodiment, recovery disk image accesser 350 can include a boot loader to load a kernel that can access the recovery disk image. In one embodiment, the kernel can access the recovery disk image is accessed by the kernel using a disk image driver.

Network connection establisher 360 can establish a network connection using the recovery disk image. In one embodiment, the recovery disk image contains network software which can be used by network connection establisher 360 to establish the network connection. In one embodiment, network connection establisher 360 further opens a web browser for the user. In one embodiment, the web browser is opened to a predetermined website stored in the recovery disk image. In one embodiment, the predetermined website can be stored by the manufacturer of the computer system to be a website associated with the manufacturer.

Data downloader 370 can download data for the type of recovery obtained by recovery type obtainer 340. If the type of recovery obtained by recovery type obtainer 340 is an operating system recovery, data downloader 370 can download a plurality of installation packages to install an operating system previously installed on the computer system in accordance with an identifier. In one embodiment, if the type of recovery obtained by recovery type obtainer 340 is a disk repair, data downloader 370 may not download any data. In an alternate embodiment, if the type of recovery obtained by recovery type obtainer 340 is a disk repair, data downloader 370 can download a disk repair utility. In one embodiment, if the type of recovery obtained by recovery type obtainer 340 is a password reset, data downloader 370 may not download any data. In an alternate embodiment, if the type of recovery obtained by recovery type obtainer 340 is a password reset, data downloader 370 can download data associated with a user in accordance with an identifier. If the type of recovery obtained by recovery type obtainer 340 is a restore of user data from a backup, data downloader 370 can download data associated with the user that has been stored as backup data.

In one embodiment, data downloader 370 can download an updated recovery disk image to update the existing recovery disk image.

Recovery performer 380 can perform a recovery of the computer system in accordance with the recovery type obtained by recovery type obtainer 340. In one embodiment, recovery performer 380 can perform the recovery of the computer system using data downloaded by data downloader 370.

Figure 4:
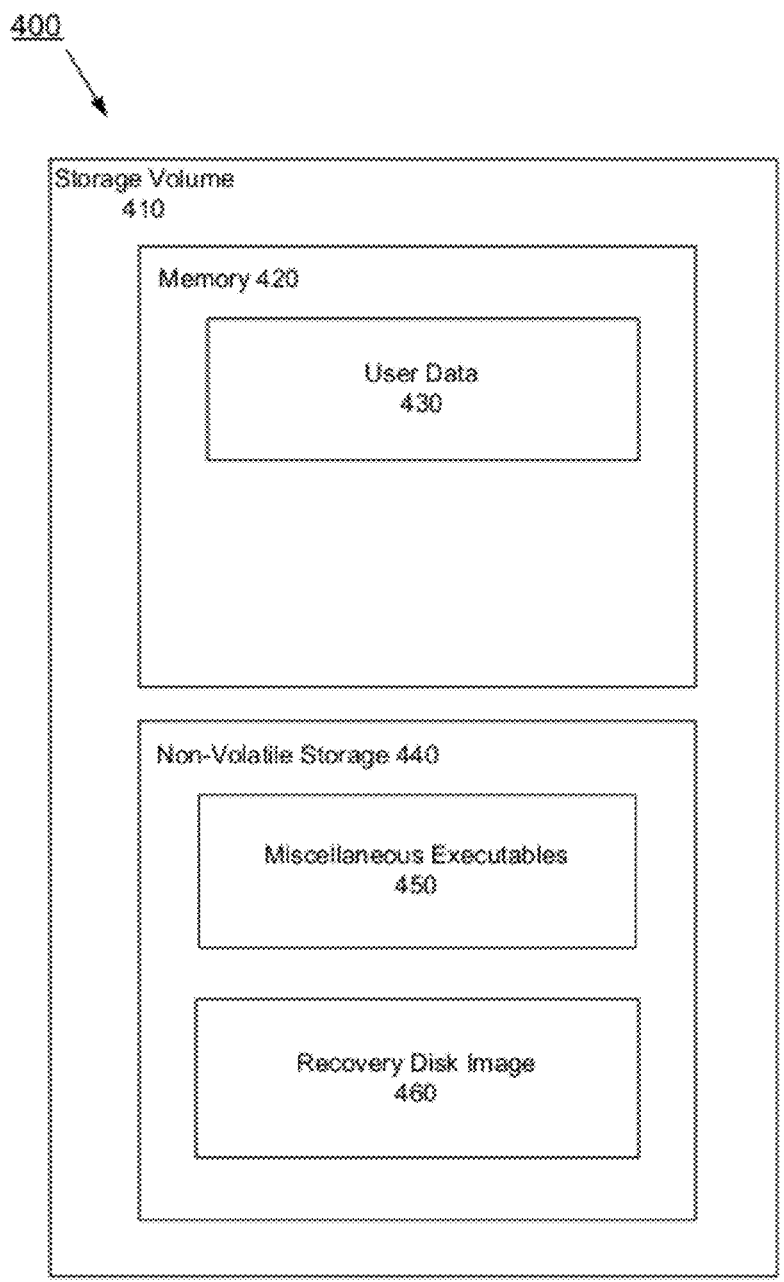
FIG. 4 illustrates an exemplary storage volume prior to the use of the networked recovery system in accordance with embodiments of the present invention.

FIG. 4 illustrates an exemplary storage volume prior to the use of the networked recovery system in accordance with embodiments of the present invention. Referring to FIG. 4, storage volume 410 contains memory 420 and non-volatile storage 440. Within memory 420, there is user data 430.

Within non-volatile storage 440, there is miscellaneous executables 450 and recovery disk image 460. In one embodiment, non-volatile storage 440 can retain stored data even if memory 420 is overwritten or erased. In this embodiment, a networked recovery can be performed on memory 420 without affecting the contents of non-volatile storage 440. Miscellaneous executables 450 can include various executables stored by a computer system in non-volatile storage. For example, miscellaneous executables 450 can include an EFI login window, a booter, a kernel, a kernel cache, etc.

In one embodiment, recovery disk image 460 can be a slimmed down version of an operating system. In this embodiment, the slimmed down version of the operating system can include the portions of an operating system that cam allow interaction with a user to obtain a recovery type, establish a network connection, backup data, download data, and perform a recovery of the computer system. In one embodiment, recovery disk image 460 can be compressed to reduce the amount of storage that is used by recovery disk image 460. In one embodiment, recovery disk image 460 may not contain any installation packages that can be used to install an operating system.

Although memory 420 has been shown as a single memory, this is just one illustrative embodiment. In alternate embodiments, memory 420 can be split into more than one memory. Although non-volatile storage 460 has been shown as a single storage unit, this is just one illustrative embodiment. In alternate embodiments, non-volatile storage 460 can be split into more than one non-volatile storage unit.

Figure 5:
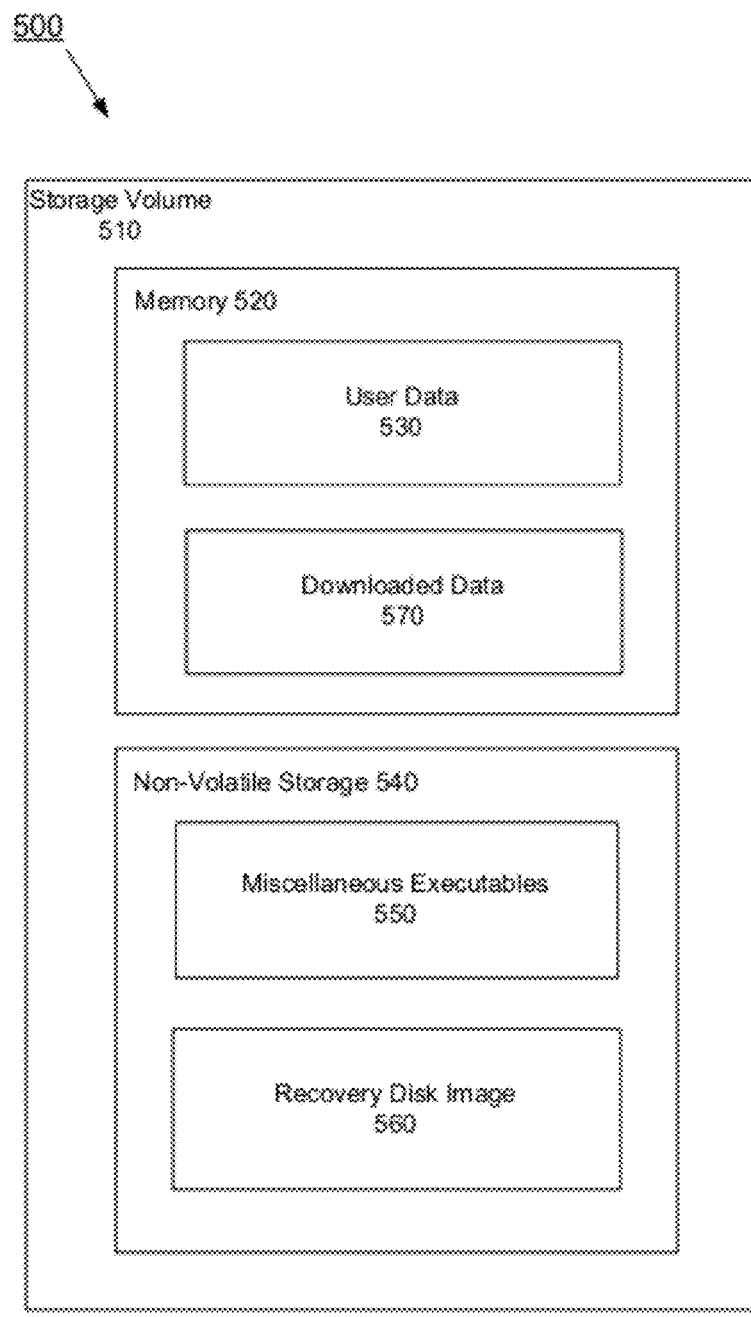
FIG. 5 illustrates an exemplary storage volume subsequent to the use of the networked recovery system in accordance with embodiments of the present invention.

FIG. 5 illustrates an exemplary storage volume after the use of the networked recovery system in accordance with embodiments of the present invention. Referring to FIG. 5, storage volume 510 contains memory 520 and non-volatile storage 540. Within memory 520, there is user data 530 and downloaded data 570. Downloaded data 570 may be downloaded using the networked recovery system and can be used to perform a recovery of the computer system.

Within non-volatile storage 540, there is miscellaneous executables 550 and recovery disk image 560. In one embodiment, non-volatile storage 540 can retain stored data even if memory 520 is overwritten or erased. In this embodiment, a networked recovery can be performed on memory 520 without affecting the contents of non-volatile storage 540. Miscellaneous executables 550 can include various executables stored by a computer system in non-volatile storage. For example, miscellaneous executables 550 can include an EFI login window, a booter, a kernel, a kernel cache, etc.

In one embodiment, recovery disk image 560 can be a slimmed down version of an operating system. In this embodiment, the slimmed down version of the operating system can include the portions of an operating system that allow interaction with a user to obtain a recovery type, that can establish a network connection, that can backup data, that can download data, and that can perform a recovery of the computer system. In one embodiment, the recovery of the computer system can be performed by recovery disk image 560 using downloaded data 570. In an alternate embodiment, the recovery of the computer system can be performed by recovery disk image 560 by accessing existing data (not shown) in memory 520 that is not included in downloaded data 570. In one embodiment, recovery disk image 560 can be compressed to reduce the amount of storage that is used by recovery disk image 560. In one embodiment, recovery disk image 560 may not contain installation packages that can be used to install an operating system.

Although memory 520 has been shown as a single memory, this is just one illustrative embodiment. In alternate embodiments, memory 520 can be split into more than one memory. Although non-volatile storage 560 has been shown as a single storage unit, this is just one illustrative embodiment. In alternate embodiments, non-volatile storage 560 can be split into more than one non-volatile storage unit.

Figure 6:
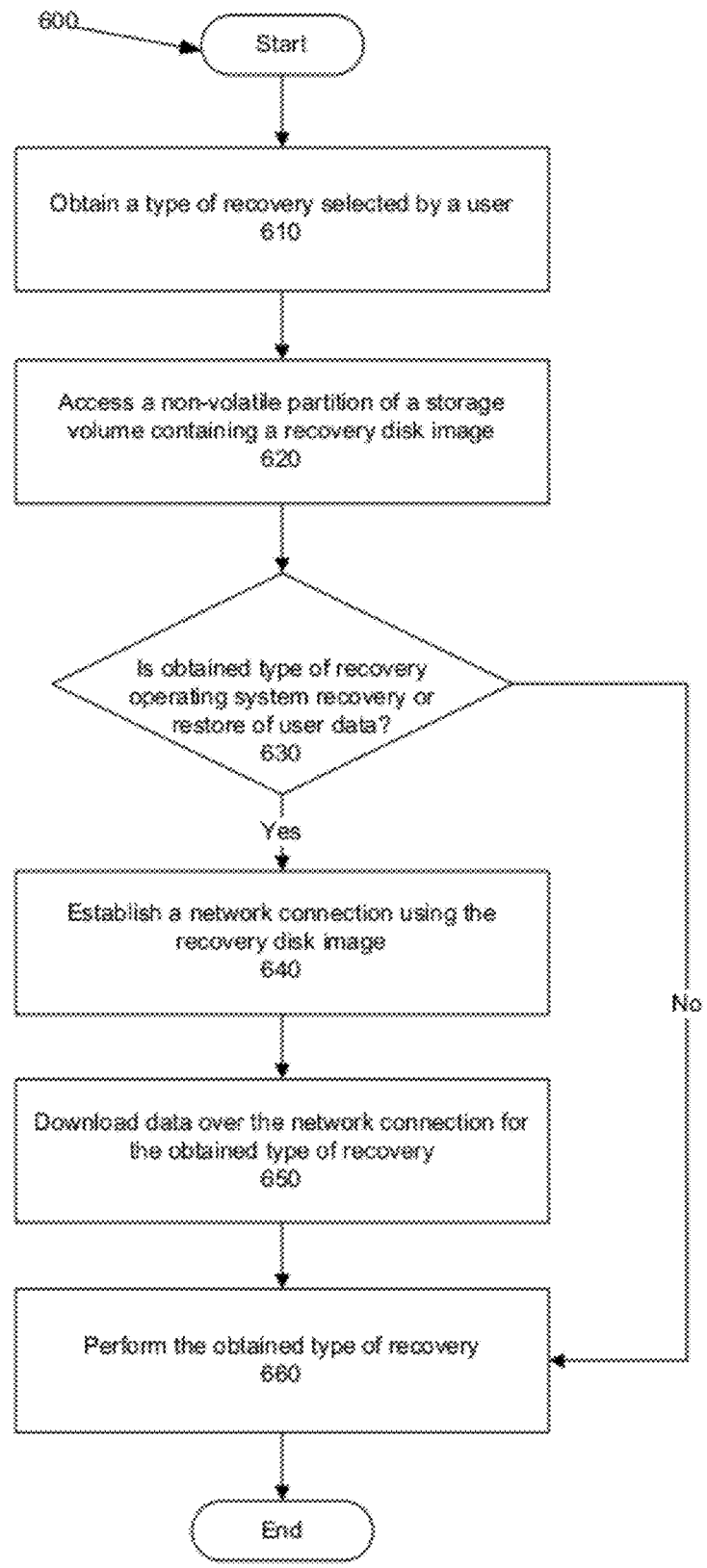
FIG. 6 illustrates a flow diagram of a networked recovery method in accordance with embodiments of the present invention.

FIG. 6 illustrates an exemplary flow diagram of a networked recovery method in accordance with embodiments of the present invention. In one embodiment, networked recovery method 600 is performed by recovery type obtainer 340, recovery disk image accesser 350, network connection establisher 360, data downloader 370, and recovery performer 380 of FIG. 3.

Referring to FIG. 6, method 600 starts at block 610 to obtain a type of recovery selected by a user. In one embodiment, the user can start the selection of a type of recovery by entering a predetermined sequence of keys. For example, the predetermined sequence of keys may be "<cntrl>R" or "<command>R". In one embodiment, the predetermined sequence of keys can be entered when the computer system is being booted up. In an alternate embodiment, the predetermined sequence of keys can be entered at any time. In one embodiment, the obtained type of recovery can be an operating system recovery. In an alternate embodiment, the obtained type of recovery can be a restore of user data from a backup. In another alternate embodiment, the obtained type of recovery can be a repair of a disk. In yet another alternate embodiment, the obtained type of recovery can be a password reset. In one embodiment, a user interface can allow interaction with the user to obtain the recovery type as selected in the user interface by the user. In one embodiment, the user interface can be executed by the operating system running on the computer system. In an alternate embodiment, the user interface can be executed by the recovery disk image. In yet an alternate embodiment, the user interface can be executed by boot files that can access the recovery disk image. The process then proceeds to block 620.

At block 620, a storage volume containing a recovery disk image is accessed. In one embodiment, the storage volume containing the recovery disk image can be accessed by reading the partition of the storage volume that contains the recovery disk image. In this embodiment, the partition of the storage volume that contains the recovery disk image can be read by a kernel that is loaded by a boot loader. In this embodiment, the recovery disk image can be in a partition determined by a manufacturer of the computer system. In one embodiment, the partition of the storage volume that can contain the recovery disk image is non-volatile. In an alternate embodiment, the partition of the storage volume that can contain the recovery disk image is volatile. In one embodiment, the recovery disk image can be a slimmed down version of an operating system. In this embodiment, the slimmed down version of the operating system can include portions of an operating system to perform a networked recovery in accordance with method 600. The recovery disk image can be used to backup data over the network connection to a backup server. In one embodiment, the backup server is the same server used to download data in the case of a recovery. In an alternate embodiment, the backup server is accessible to the server used to download data in the case of a recovery. In one embodiment, the recovery disk image can back up data at a predetermined interval of time. In an alternate embodiment, the recovery disk image can back up data at a request of a user. In one embodiment, the recovery disk image can be compressed to reduce the amount of storage that is used by the recovery disk image. In one embodiment, the recovery disk image may not contain installation packages that can be used to install an operating system. The process then proceeds to block 630.

At block 630, a determination is made of whether the obtained type of recovery is an operating system recovery or a restore of user data. If the obtained type of recovery is not an operating system recovery or restore of user data, the method proceeds to block 660. If the obtained type of recovery is an operating system recovery or restore of user data, the method proceeds to block 640.

At block 640, a network connection is established using the recovery disk image. In one embodiment, network software in the recovery disk image is used to establish the network connection between the computer system and the server containing recovery data. Once the network connection has been established, data can be exchanged between the computer system and the server containing the recovery data. The process then proceeds to block 650.

At block 650, data is downloaded over the network connection for the obtained type of recovery from a server. The downloaded data can depend on the obtained type of recovery selected by the user. In one embodiment, the downloaded data is downloaded over the established network connection from the server containing recovery data. If the obtained type of recovery is an operating system recovery, a plurality of installation packages can be downloaded to install a version of an operating system on the system in accordance with an identifier. In one embodiment, the identifier is an identification of a user who purchased or is associated with the computer system. In an alternate embodiment, the identifier is a serial number associated with the computer system. Information is obtained about a version of the operating system to be installed on the system as described below in conjunction with FIG. 7. Once the information is obtained by the recovery disk image, the recovery disk image can download installation packages from a server in accordance with the obtained information. If the obtained type of recovery is a restore of user data, user data can be downloaded over the network connection. In one embodiment, the user data is stored on a backup server (e.g., Apple Time Machine™), that can be accessed using the network connection.

In one embodiment, in addition to installation packages or user data, an updated recovery disk image can be downloaded over the network connection to update the existing recovery disk image. In one embodiment, the updated recovery disk image may not be updated when an operating system update is performed on the computer system. In one embodiment, the existing recovery disk image can be updated automatically when a new version of the recovery disk image is available.

At block 660, the obtained type of recovery is performed. If the obtained type of recovery is an operating system recovery, the installation packages downloaded in accordance with the identifier can be used to reinstall the operating system on the computer system. In one embodiment, the reinstall can be performed using a kernel or a booter stored in non-volatile storage. In one embodiment, the installation packages can rewrite only a partition of a storage volume that is volatile. In this embodiment, the recovery disk image, and the remainder of the non-volatile storage in the storage volume may not be overwritten by the re-installation of the operating system.

If the obtained type of recovery is a disk repair, the recovery can be performed by running a disk repair utility on the computer system. In one embodiment, the disk repair utility can be stored in the recovery disk image. The disk repair utility may repair one or more portions of the disk to repair failures of the disk. If the obtained type of recovery is a password reset, a portion of memory that stores one or more passwords for the computer system can be accessed to reset the user password. In one embodiment, a user selects a password that the user desires to be reset. In an alternate embodiment, all stored passwords are reset. In one embodiment, the user password can be reset by clearing the portion of memory that stores the password(s) for the computer system. In an alternate embodiment, the user password can be reset by updating the portion of memory that stores the password(s) for the computer system with a new password provided by a user. If the obtained type of recovery is a restore of user data from a backup, downloaded backup data can be used to update user data stored in the computer system. The process then ends.

Method 600 illustrates one implementation of networked recovery. In alternate embodiments, the order in which the blocks of method 600 are performed can be modified without departing from the scope of the invention. In one embodiment, method 600 can obtain a type of recovery selected by a user prior to accessing a non-volatile partition of a storage volume containing a recovery disk image and establishing a network connection using the recovery disk image. In an alternate embodiment, method 600 can access the non-volatile partition of a storage volume containing a recovery disk image prior to obtaining a type of recovery selected by a user and then establish a network connection using the recovery disk image. In an alternate embodiment, method 600 can first access the non-volatile partition of a storage volume containing a recovery disk image followed by establishing a network connection using the recovery disk image prior to obtaining a type of recovery selected by a user.

Figure 7:
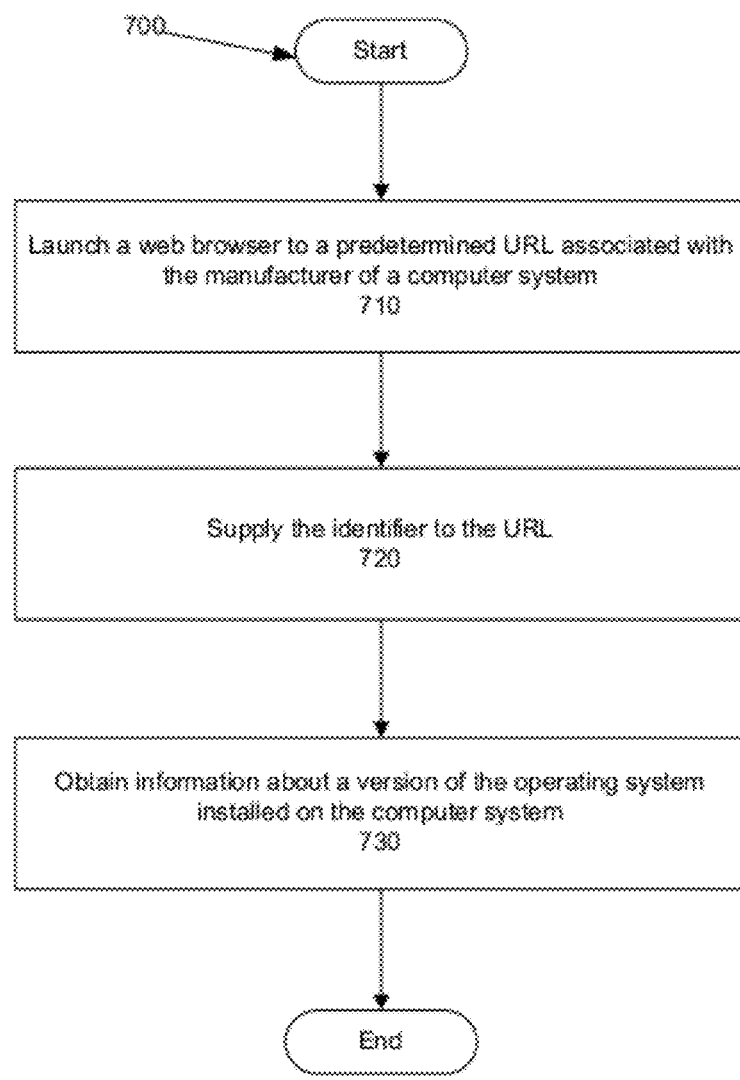
FIG. 7 illustrates a flow diagram of an operating system version determination method in accordance with embodiments of the present invention.

FIG. 7 illustrates an exemplary flow diagram of an operating system version determination method in accordance with embodiments of the present invention. In one embodiment, operating system determination method 700 is performed by data downloader 370 of FIG. 3.

Referring to FIG. 7, method 700 starts at block 710 to launch a web browser to a predetermined Uniform Resource Locator (URL) associated with a manufacturer of the computer system. In one embodiment, the predetermined URL can be a URL of an online store associated with the manufacturer. The process then proceeds to block 720.

At block 720, the identifier can be supplied to the predetermined URL. In one embodiment, the identifier can be entered by the user into one or more fields in the URL. In an alternate embodiment, the identifier can be automatically entered into one or more fields in the URL using identifier information supplied by the user in a user interface. In one embodiment, the identifier information may be authorized by the URL by requesting a user to enter in a password in addition to the identifier. In one embodiment, if the identifier is a serial number of the computer system, the user may need to obtain the serial number prior to reinstalling the operating system. In an alternate embodiment, the serial information is read by the computer system and is supplied directly to the URL without any interaction from the user. The process then proceeds to block 730.

At block 730, information about a version of the operating system installed on the computer is obtained from the URL. In one embodiment, if the identifier is the identification information of the user, that information is used by the URL to determine if the user has purchased a version of the operating system that is different than the version originally installed on the computer system. In this embodiment, if the user has purchased a version of the operating system that is different than the version originally installed on the computer system, the information obtained can be the purchased version of the operating system. If the user has not purchased a version of the operating system that is different from the version originally installed on the computer system, the information obtained can be the originally installed version of the operating system. For example, if a user purchased a computer system with Mac OS X™ version 10.5 installed, and subsequently purchased Mac OS X™ version 10.6, the information obtained can be Mac OS X™ version 10.6. In an alternate embodiment, if the identifier is a serial number of the system, the serial number of the system can be used to determine a version of the operating system originally installed on a computer system.

The methods as described herein are not described with reference to any particular programming language. It will be appreciated that a variety of programming languages may be used to implement the teachings of the present invention as described herein. Furthermore, it is common in the art to speak of software, in one form or another (e.g., program, procedure, process, application, module, logic, etc.), as taking an action or causing a result. Such expressions are merely a shorthand way of saying that execution of the software by a computer causes the processor of the computer to perform an action or produce a result. It will be further appreciated that more or fewer processes may be incorporated into the methods 600 and 700 in FIG. 6 and FIG. 7 respectively, without departing from the scope of the invention and that no particular order is implied by the arrangement of blocks shown and described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A computer-implemented method for recovery of a system, the method comprising:
   receiving, from a user, a selection of a type of recovery process;
   accessing a non-volatile partition of a storage volume included in the system, wherein the non-volatile partition includes a recovery disk image that does not include an installation package;
   establishing, using the recovery disk image, a network connection to a predetermined uniform resource locator (URL);
   supplying an identifier to the URL, wherein the identifier is an identification of the user or the identifier is a serial number associated with the system;
   downloading data over the network connection for the selected type of recovery, wherein the data is associated with the supplied identifier; and
   performing, using the recovery disk image and the downloaded data, the selected type of recovery.

2. The method of claim 1, wherein the selected type of recovery is selected from a group consisting of: an operating system recovery, a restore of user data from a backup, a repair of a disk included in the system, and a password reset.

3. The method of claim 2, wherein performing the selected type of recovery of the system involves resetting a password associated with the system when the selected type of recovery is the password reset.

4. The method of claim 1, wherein the downloaded data comprises a plurality of installation packages that, when executed, install a factory-default operating system originally installed on the system when the identifier identifies the factory-default operating system.

5. The method of claim 1, wherein the downloaded data comprises a plurality of installation packages that, when executed, install an operating system not originally installed on the system.

6. The method of claim 1, wherein the downloaded data comprises an updated recovery disk image.

7. The method of claim 6, wherein the updated recovery disk image is downloaded when a new version of the recovery disk image is available.

8. A non-transitory computer-readable storage medium comprising executable instructions to cause a processor to perform operations for recovery of a system, the instructions comprising:
   receiving, from a user, a selection of a type of recovery process;
   accessing a storage volume included in the system, wherein the storage volume includes a recovery disk image;
   establishing, using the recovery disk image, a network connection to a predetermined uniform resource locator (URL);
   supplying an identifier to the URL, wherein the identifier is an identification of the user or the identifier is a serial number associated with the system;
   downloading data over the network connection for the selected type of recovery, wherein the data is associated with the supplied identifier; and
   performing, using the recovery disk image and the downloaded data, the selected type of recovery.

9. The medium of claim 8, wherein the selected type of recovery is selected from a group consisting of: an operating system recovery, a restore of user data from a backup, a repair of a disk included in the system, and a password reset.

10. The medium of claim 9, wherein performing the selected type of recovery of the system involves resetting a password associated with the system when the selected type of recovery is the password reset.

11. The medium of claim 8, wherein the downloaded data comprises a plurality of installation packages that, when executed, install a factory-default operating system originally installed on the system when the identifier identifies the factory-default operating system.

12. The medium of claim 8, wherein the downloaded data comprises a plurality of installation packages that, when executed, install an operating system not originally installed on the system.

13. The medium of claim 8, wherein the downloaded data comprises an updated recovery disk image.

14. The medium of claim 13, wherein the updated recovery disk image is downloaded when a new version of the recovery disk image is available.

15. An apparatus comprising:
   means for receiving a selection of a type of recovery process;
   means for accessing a non-volatile partition of a storage volume included in the system, wherein the non-volatile partition includes a recovery disk image that does not include an installation package;

means for establishing, using the recovery disk image, a network connection to a predetermined uniform resource locator (URL);

means for supplying an identifier to the URL, wherein the identifier is an identification of a user associated with the system or the identifier is a serial number associated with the system;

means for downloading data over the network connection for the selected type of recovery, wherein the data is associated with the supplied identifier; and means for performing, using the recovery disk image and the downloaded data, the selected type of recovery.

16. The apparatus of claim 15, wherein the selected type of recovery is selected from a group consisting of: an operating system recovery, a restore of user data from a backup, a repair of a disk included in the system, and a password reset.

17. The apparatus of claim 16, wherein performing the selected type of recovery of the system involves resetting a password associated with the system when the selected type of recovery is the password reset.

18. The apparatus of claim 15, wherein the downloaded data comprises a plurality of installation packages that, when executed, install a factory-default operating system originally installed on the system when the identifier identifies the factory-default operating system.

19. The apparatus of claim 15, wherein the downloaded data comprises a plurality of installation packages that, when executed, install an operating system not originally installed on the system.

20. The apparatus of claim 15, wherein the downloaded data comprises an updated recovery disk image.

21. The apparatus of claim 20, wherein the updated recovery disk image is downloaded when a new version of the recovery disk image is available.

22. A computer system comprising:
a memory; and
a processor configurable by instructions stored in the memory to:

receive, from a user, a selection of a type of recovery process;

access a non-volatile partition of a storage volume included in the system, wherein the non-volatile partition includes a recovery disk image;

establish, using the recovery disk image, a network connection to a predetermined uniform resource locator (URL);

supply an identifier to the URL, wherein the identifier is an identification of the user or the identifier is a serial number associated with the system;

download data over the network connection for the selected type of recovery, wherein the data is associated with the supplied identifier; and perform, using the recovery disk image and the downloaded data, the selected type of recovery.

23. The system of claim 22, wherein the selected type of recovery is selected from a group consisting of: an operating system recovery, a restore of user data from a backup, a repair of a disk included in the system, and a password reset.

24. The system of claim 23, wherein performing the selected type of recovery of the system involves resetting a password associated with the system when the selected type of recovery is the password reset.

25. The system of claim 22, wherein the downloaded data comprises a plurality of installation packages that, when executed, install a factory-default operating system originally installed on the system when the identifier identifies the factory-default operating system.

26. The system of claim 22, wherein the downloaded data comprises a plurality of installation packages that, when executed, install an operating system not originally installed on the system.

27. The system of claim 22, wherein the downloaded data comprises an updated recovery disk image.

28. The system of claim 27, wherein the updated recovery disk image is downloaded when a new version of the recovery disk image is available.

* * * * *